Patented May 26, 1942

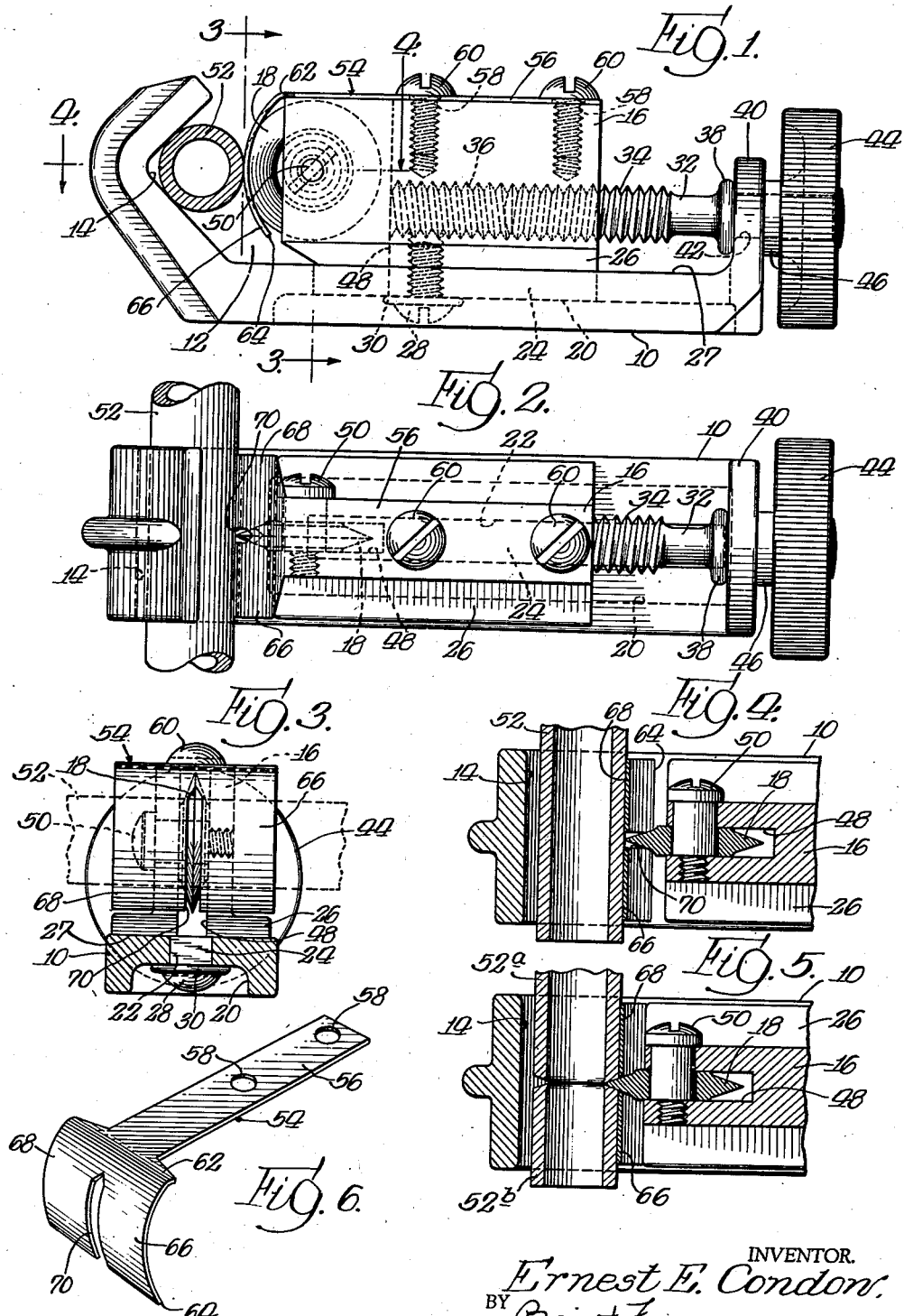

2,284,133

UNITED STATES PATENT OFFICE 2,284,133

TUBE CUTTER

Ernest E. Condon, Flushing, N. Y., assignor to The Imperial Brass Manufacturing Company, Chicago, Ill., a corporation of Illinois Application September 8, 1941, Serial No. 409,967

4 Claims. (Cl. 30—124)

My invention relates to tube cutters and particularly small hand-operated tube cutters which are used by mechanics in cutting thin-walled tubing such as copper, aluminum, thin-walled steel tubing and the like.

Among the objects of my invention is to provide a tube cutter which is so fastened to the tube during the cutting operation that it will remain in place on a length of tube after the parts of the tube have been severed one from another.

Another object of my invention is to provide a new and improved tube cutter equipped with a holding element which grips the tube being cut on both sides of the point where the tube is to be severed so that it continues to hold both severed parts of the tube in the cutter after the cutting operation has been completed.

Also among the objects of my invention is to provide an auxiliary attachment for a tube cutter which operates with the portion of the cutter bearing the cutting element so that as the cutting element is advanced into contact with the tube, the attachment is brought into contact with the tube also and continues to hold the tube within the cutter and the parts of the tube likewise adjacent each other after the cutting operation has been completed and which is so arranged that the severed parts of the tube can be separated from each other and from the tool without it being necessary to retract the cutting element from its completed cutting position within the cutter.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a side elevational view of a tube cutter equipped with the invention;

Figure 2 is a top view of the cutter shown in Figure 1;

Figure 3 is a cross sectional view taken on the line 3—3 of Figure 1;

Figure 4 is a fragmentary, vertical section taken on the line 4—4 of Figure 1;

Figure 5 is a view similar to Figure 4 showing the position of the parts of the tube cutter after the cutting operation has been completed; and Figure 6 is a perspective view of the tube-holding element with which the tube cutter is equipped.

Tube cutters and pipe cutters in general have been known for a great many years and particularly cutters of the type provided with a recess for holding the pipe or tubing and a cutting element such as a disc with sharpened edges or a knife of some kind designed to be advanced into cutting position for progressively cutting the tube or pipe as the tube cutter is rotated around the circumference of the pipe. It has been found that while these cutters are satisfactory so far as the actual operation of severing one piece of pipe or tubing from another is concerned, nevertheless as heretofore constructed, no means has been provided for gripping the severed parts of the pipe or tubing after the cutting operation has been completed so that they will not drop to the floor or fall out of the workman's hands in places where they cannot be easily retrieved. Likewise in the past, no means has been provided whereby the pipe or tube cutter has been secured to a length of tube and whereby it remains secured thereto after the cutting operation. Although it is a simple matter for a mechanic to grip the tube in one hand and the cutter in the other during the cutting operation, as soon as the operation has been completed there are three pieces to be grasped, namely, two ends of the tubing and the cutter, each detached one from another, so that a mechanic has difficulty in holding all three pieces at once.

In the embodiment selected to illustrate my invention, there is shown a tube cutter of a more or less conventional design comprising a body member 10 having a recess 12 and a groove 14 for holding a length of pipe or tubing. A cutter block member 16 is mounted for operation on the body and carries a tube-cutting element 18, here illustrated as a knife-edged disc.

The body as shown in the drawing has a recess or channel 20 at the bottom side and at the bottom of the recess is a slot 22.

The cutter block has a somewhat rectangular shape when viewed from the side and is provided with a flange 24 at the bottom side which fits in the slot 22 in the body. The flange is designed to slide back and forth in the slot, permitting the cutter block to move from right to left and left to right, as viewed in Figures 1 and 2. The block is likewise provided with a lateral flange 26 on each side which rests upon a flat surface 27 of the body within the recess 12. The position of the flanges on the cutter block can be observed advantageously in Figure 3 in company with Figure 1. In order that the block may be permanently secured to the body, there is provided a screw 28 having a washer 30 at the head end which overlaps the sides of the slot 22. The screw is threadably mounted in the bottom side of the cutter block and fastens the block in sliding relationship on the body 10.

At the right end of the cutter block, as viewed in Figures 1 and 2, there is provided a manual adjusting means comprising a screw 32 having a threaded end 34 with left-hand threads. The threads in turn are received within a threaded aperture 36 in the cutter block. Adjacent its right-hand end the screw 32 is provided with an angular collar 38. The body is provided with an upstanding bracket 40 having an aperture 42 comprising a bearing for mounting the right-hand end of the screw 32. As shown, the annular collar 38 bears against one side of the bracket and the screw has a handle 44 with a collar 46 bearing against the other side of the bracket, thereby firmly mounting the adjusting screw in position.

The cutter disc 18 is mounted at the left-hand end of the cutter block as viewed in Figure 1 wherein it is received in a slot 48 and held in place by a bearing screw 50. The mounting of the cutter disc can best be seen in Figures 3, 4 and 5.

The holding element for holding the tube cutter on a length of tube 52 both before and after the tube has been cut comprises a resilient member 54 shown in perspective in Figure 6. The resilient holding element consists of a base portion 56 having screw holes 58 which is designed to lie against the cutter block and be secured thereto by means of screws 60 in the position shown in Figures 1 and 2. As shown, the holding element has a broadened end 62 at the left-hand side as viewed in Figures 1, 2 and 6. The broadened end is resilient in character and is curved as shown in Figure 1 with the concave portion of the curve directed toward the tubing 52. The resilient portion is here shown having a free end 64. Moreover, the resilient portion is separated into two parts 66 and 68 which are divided by a slot 70 designed to receive the edge of the cutter disc.

In operation, the tube 52 of a size to be cut is placed within the groove 14. Meanwhile, the cutter block has been retracted in the recess 12 by manipulation of the handle wheel 44 of the screw 32 in a left-hand direction whereby the cutter block is withdrawn out of the space occupied by the tube. After the tube has been placed within the groove, the cutter block is moved from right to left as viewed in Figures 1 and 2 by rotation of the handle wheel 44. As the wheel is rotated, the cutter block is advanced to cutting position until the edge of the cutting disc 18 is forced into contact with the circumference of the tubing. As the cutter wheel is brought into contact with the tubing, the side portions 66 and 68 of the holding element are likewise pressed into contact with the circumference of the tubing and bent backwards due to the resilient character of the material from which they are made, permitting the cutter disc to be forced a slight distance into the wall of the tubing. After the disc has been forced into place, the cutter is rotated and after a few rotations, the disc is advanced further and the rotations continued until the disc passes from the position shown in Figure 4 to the position shown in Figure 5. When the cutter disc occupies the position shown in Figure 5, the tubing is severed so that one part 52a lies on one side of the cutter disc and another part 52b lies on the opposite side.

In spite of the parts of the tube having been separated one from another by the cutting operation, the resilient portion 68 of the holding element continues to hold the severed portion 52a within the groove of the tube cutter body and the portion 66 of the holding element holds the severed portion 52b within the groove. By this action, not only are the severed parts of the tube held together temporarily, but also the cutter is temporarily held in position on the end of one or the other of the lengths of tube so that it will not fall off one cut end of the tube when the other end of the tube is removed.

When it is desired to separate the severed ends of the tube, it is necessary only to pull endwise on either the part 52a or the part 52b and extract it from the resilient grip of the tube-holding element. Thereafter, the cutter block can be retracted by manipulation of the handle wheel 44 preparatory to proceeding with another cutting operation.

It will be noted that the holding element is merely pressed into releasable resilient contact with the outside circumference of the tubing to be cut and that it holds the tube on the cutter and the parts of the tube together only through frictional resilient contact. In thus holding the parts together, however, the grip on the tube prevents the tool from falling out of the mechanic's hands after the cutting operation is over, while permitting separation of the parts without any readjustment of the tool. There has thus been provided a novel holding element for securing a tube cutter on tubing which is very simple in its operation and which can be made part of the average, conventional tube cutter.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A tube cutter comprising a body member having a groove for holding tubing, a cutter block member movably mounted on the body member having a positive feeding mechanism for setting said cutter block member at various fixed positions relative to the groove, a tube-cutting element on the cutter block member, and a holding element attached to one of said members having a portion releasably urged against a tube during a cutting operation wherein said holding element holds one of the severed parts of the tube in the groove after the cutting operation has been completed.

2. A tube cutter comprising a body member having a groove at one side for holding tubing, a cutter block member movably mounted on the body member for movement toward and away from the groove, a tube-cutting element on the cutter block member, extension means attached to the block and body members for advancing and retracting the block member to and from cutting position and a holding element attached to one of said members having a resilient portion positioned between the groove and the cutter block member extending into the space designed to receive a tube wherein it presses against the tube when the cutter member is advanced through a cutting operation and wherein said resilient portion holds the severed parts of the tube after the cutting operation has been completed.

3. A tube cutter comprising a body member having a recess therein grooved at one side for holding tubing, a cutter block member movably mounted on the body member within the recess for movement toward and away from the groove, a tube-cutting element on the cutter block member having a fixed position relative to the cutter block member, manually adjustable means attached to the block and body members for advancing and retracting the block member to and from cutting position and a holding element attached to one of said members having a resilient portion overlying the groove adjacent the cutting element in position wherein it presses against the tube when the cutter member is advanced through a cutting operation and wherein said resilient portion holds the severed parts of the tube in the groove after the cutting operation has been completed.

4. A tube cutter comprising a body having a recess therein grooved at one side for holding tubing, a cutter block movably mounted on the body within the recess for movement toward and away from the groove, a tube-cutting element on the cutter block, manually adjustable means attached to the block and body for advancing and retracting the block to and from cutting position and a holding element attached to the cutter block comprising a flat sheet of material having a portion anchored to one side of the cutter block and another portion of resilient character extending around the face of the block adjacent the groove, said other portion having a part on each side of the cutter element, and a slot therebetween for reception of the cutter element during flexing of said resilient portion while a tube is being cut.

ERNEST E. CONDON.